United States Patent

Sikes

[15] 3,706,403
[45] Dec. 19, 1972

[54] GUN HOLDING DEVICE

[72] Inventor: Robert L. F. Sikes, Rt. 1, Crestview, Fla. 32536

[22] Filed: Oct. 26, 1971

[21] Appl. No.: 192,359

[52] U.S. Cl........224/1 R, 224/42.42 R, 224/42.45 R
[51] Int. Cl..............................................F41c 33/00
[58] Field of Search..224/1 R, 3, 29 R, 29 D, 42.1 C, 224/42.45 R, 42.45 B, 2 A, 42.42 R, 42.42 A

[56] References Cited

UNITED STATES PATENTS

| 3,635,381 | 1/1972 | Hensley | 224/1 R |
| 2,632,619 | 3/1953 | Wilson | 224/42.1 C UX |
| 2,750,088 | 6/1956 | Agostini et al. | 224/29 D UX |

Primary Examiner—Robert G. Sheridan
Assistant Examiner—Jerold M. Forsberg
Attorney—Michael W. York

[57] ABSTRACT

A vehicle gun holding device for holding a gun such as a shotgun or rifle within a vehicle that has a floor with a generally curved longitudinal raised portion surrounding the upper portion of the vehicle's drive shaft and a seat mounted on the floor that includes a base that is generally shaped to fit crosswise on the curved longitudinal raised portion of the floor of the vehicle. A curved hook member is located on the upper surface of the portion of the base that is shaped to fit on one side of the raised portion of the vehicle floor and a second hook member is located on the upper surface of the portion of the base that is shaped to fit on the opposite side of the raised portion of the vehicle floor. The free end portions of the hook members point generally inward and the hook members are each adapted to receive and hold a portion such as the barrel or stock of a gun that has another portion that is resting against the vehicle seat. The vehicle gun holding device permits guns to be conveniently held within a vehicle out of the way of the vehicle occupants and yet the guns are readily accessible for prompt use if needed.

10 Claims, 7 Drawing Figures

PATENTED DEC 19 1972
3,706,403
SHEET 1 OF 2
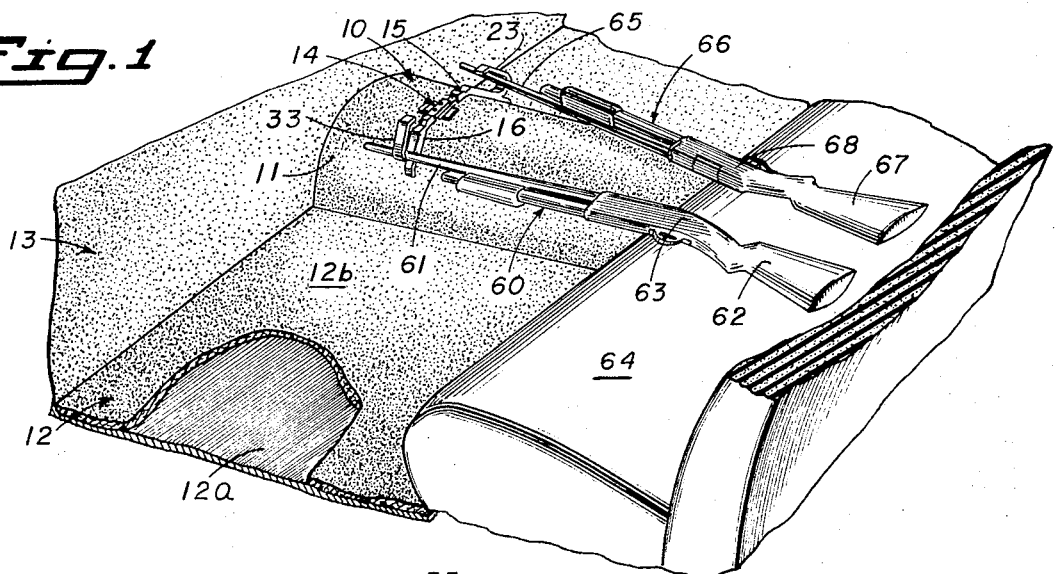
Fig.1
Fig.2
Fig.3
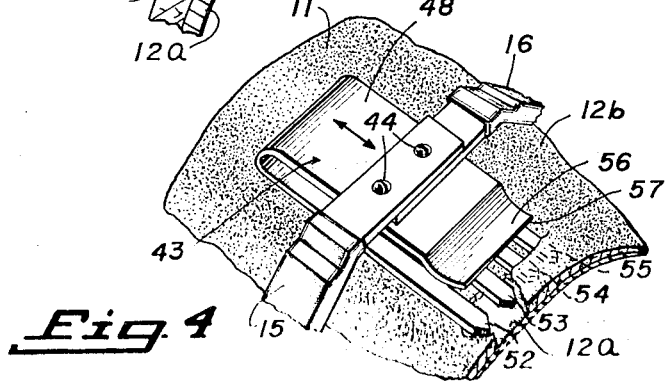
Fig.4
INVENTOR.
ROBERT L. F. SIKES
BY
Michael W. York
ATTORNEY PATENTED DEC 19 1972
3,706,403
SHEET 2 OF 2
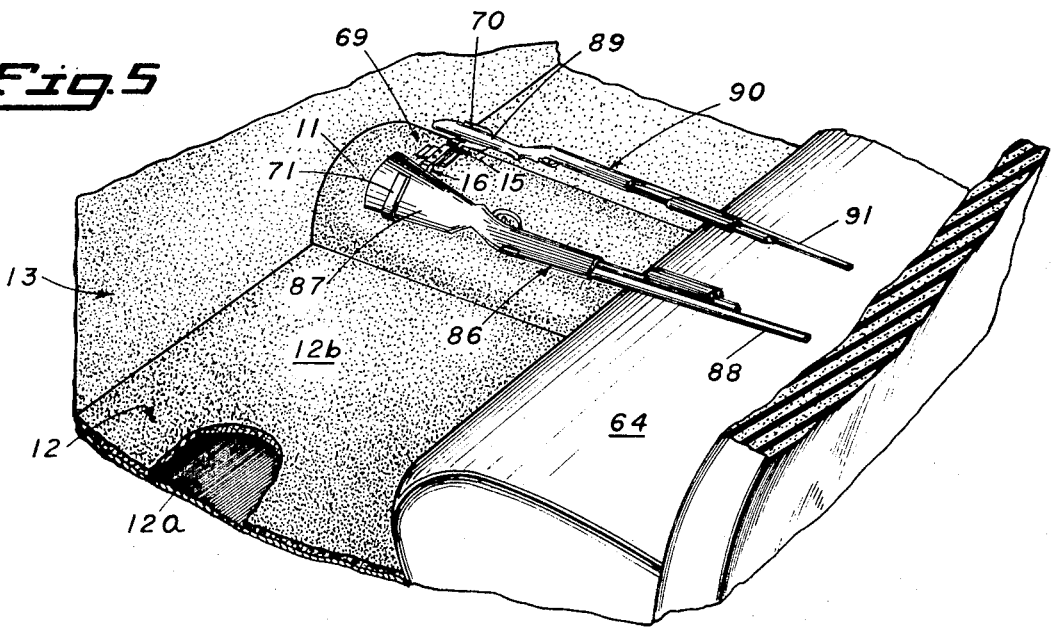
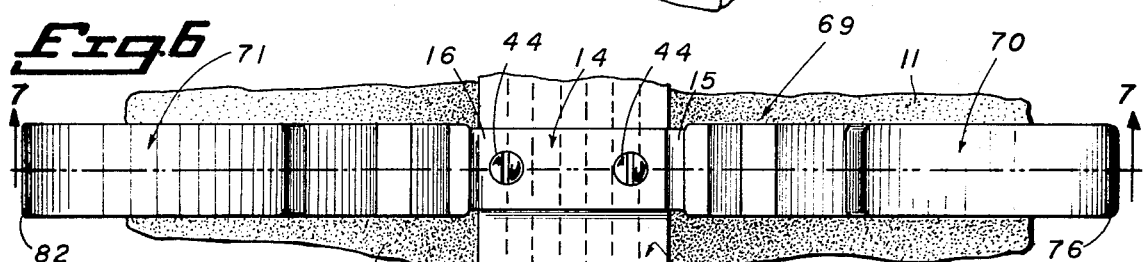
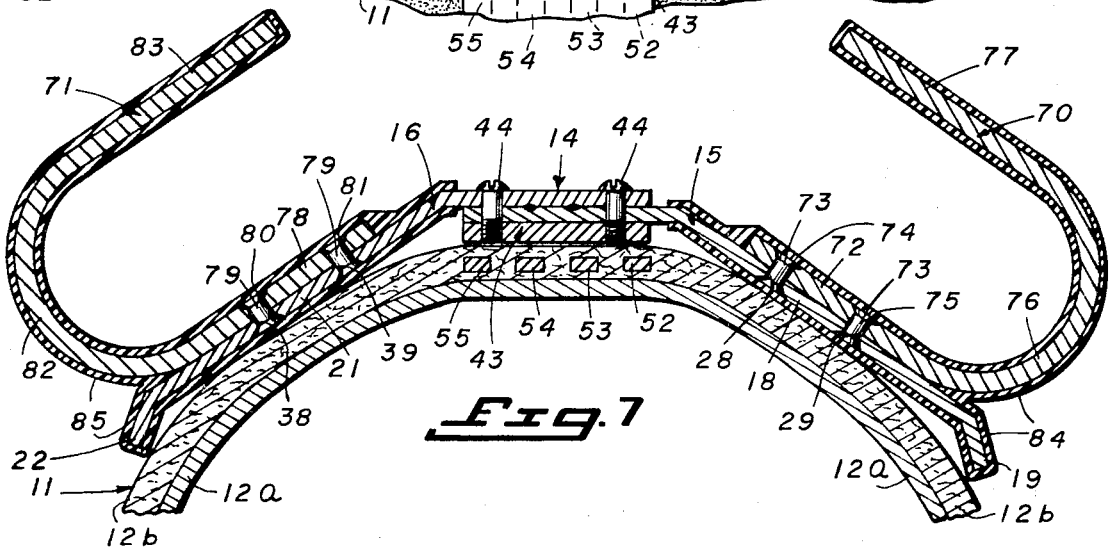
INVENTOR.
ROBERT L. F. SIKES
BY Michael W. York
ATTORNEY

GUN HOLDING DEVICE

BACKGROUND OF THE INVENTION

In many cases rifles, carbines and shotguns must be carried in vehicles such as automobiles and the like. For instance, police frequently must carry such guns or firearms in the passenger compartment of their automobiles and hunters sometimes also carry such firearms in the vehicle in which they are riding. When such firearms are carried in vehicles, it is important that the firearms be secured within the vehicle to prevent them from being thrown about within the vehicle and being possibly damaged or possibly causing injury to the occupants of the vehicle. In many instances it is important that such firearms be adequately secured within the vehicle, but at the same time it is important that such firearms be readily available for use. This is particularly true in the case of firearms that are carried within vehicles for police or military use where lives may depend upon the speed in which the firearm can be brought into use.

It is also important that the guns or firearms be secured within the vehicle in such a manner that the firearms do not interfere with the movement of occupants within the vehicle or interfere with the vehicle occupants as they enter or leave the vehicle. This is particularly true in the case of military or police vehicles where it may be required that the firearms be readily accessible within the vehicle for extended periods of time and where the vehicle occupants may be in and out of the vehicle many times in the course of their duties.

There are a number of devices that have been previously disclosed for holding or mounting guns or firearms within vehicles. U.S. Pat. No. 3,477,587 discloses a gun rack that is designed to be mounted on the underside of an automobile trunk lid. This type of gun rack has the advantage that it does not interfere with the occupants of the vehicle and this type of gun rack might be suitable for use by hunters or target shooters in cases where it is not necessary that the firearms be readily accessible. However, this type of trunk mounted gun rack would not be acceptable for military or police use where it is necessary that the firearms that are held by the rack be readily accessible within the passenger compartment of the vehicle. U.S. Pat. Nos. 2,535,564; 2,797,033; and 3,167,182 all disclose gun racks that are mounted on the front vehicle seat and support the firearms immediately behind the front vehicle seat. The firearm racks described in these patents have an advantage in that they are located within the occupant's compartment of the vehicle and they also have the advantage of not interfering with the freedom of movement of the occupants of the front seat. However, these firearm racks have a disadvantage in that the occupants of the front seat must either reach over the front seat or get out of the vehicle and open the door of the vehicle to obtain firearms from the rack and thus they are not well suited for military and police use. In addition, these types of racks that mount the firearms behind the front seat are generally not usable in cars that only have two doors, since the firearms will interfere with the movement of the backs of the front seats in a forward direction to permit access to the rear vehicle seats. These type of racks that mount the firearms on the front seat backs may also hold firearms in such a manner that they interfere with the rear seat occupant's leg room.

A number of other vehicle gun racks have been proposed that attempt to store the guns or firearms within the vehicle so that they do not interfere with the movement of the occupants within the vehicle. U.S. Pat. No. 2,823,808 discloses a rifle rack that can be mounted on the rear wall of the vehicle. However, not all vehicles have a rear wall that can accept such a rack and the firearms that are held by such a rack are not readily accessible to occupants of the front seat. U.S. Pat. No. 2,929,539 discloses a rack for firearms that can be mounted above the windshield and the sun visors. Unfortunately, many vehicles do not have sufficient room above the windshield to accommodate such a gun rack. U.S. Pat. No. 2,998,885 describes a gun rack that can be mounted to the underside of the top of the vehicle so that the firearms would be held above the occupants' heads. Such gun racks may also not be usable in many modern automobiles that have comparatively low tops, since the heads of the occupants might strike the firearms that are held by such racks or they might interfere with the rapid removal of the firearms from the rack. A gun mount that is located near the door of a vehicle is illustrated in U.S. Pat. No. 2,919,058, but such a gun mount and a firearm held by such a mount might interfere with the ease in which an occupant can enter and get out of the vehicle. Another type of gun rack is disclosed in U.S. Pat. No. 3,556,363 that is adapted to be located on a vehicle door to hold a firearm against the inside of the door. Many doors in modern automobiles are insufficiently large to accommodate many long barreled firearms and thus this type of gun rack cannot be used with many automobiles. In addition, a firearm that is secured to the inside of the vehicle door may interfere with the occupant's ability to easily operate the door handles and the handle that raises and lowers the window in the door.

U.S. Pat. Nos. 2,692,069; 2,750,088; 2,775,351; 3,477,586; and 3,497,077 discloses gun racks that are capable of being mounted on the front seat of a vehicle such as an automobile and these gun racks have the advantage of being capable of mounting firearms such as shotguns or rifles on or near the front seat of the vehicle where they are readily accessible to the occupants of the front seat. However, such gun racks are connected to or rest upon the seats and thus the gun racks may have to be adjusted or adapted to the particular type of seat that is used within the vehicle. In addition, such gun racks occupy a portion of the seat when firearms are not being held by the gun racks that would otherwise be usable and the gun racks that are mounted on or connected to the seats may cause wear or damage to the seats.

The present invention overcomes the disadvantages associated with other prior vehicle gun racks and the like and provides a vehicle gun holding device that holds guns or firearms such as shotguns and rifles within a vehicle such as an automobile so that they are readily accessible to the occupants of the vehicle and yet they are held in such a manner that they do not interfere with the vehicle occupants' freedom of movement.

BRIEF DESCRIPTION OF THE INVENTION

This invention relates to vehicle gun holding or supporting devices for holding or supporting a gun such as a shotgun or rifle within a vehicle and more particularly to vehicle gun holding or supporting devices that are adapted to be mounted on the floor of a vehicle.

It is an object of the present invention to provide a vehicle gun holding device that can be used to conveniently hold guns within a vehicle such as an automobile or the like.

It is an object of the present invention to provide a vehicle gun holding device that is capable of holding guns within a vehicle so that they are readily available for use if needed.

It is also an object of the present invention to provide a vehicle gun holding device that is capable of being easily installed within a vehicle.

It is also an object of the present invention to provide a vehicle gun holding device that is capable of holding guns so that a portion of each gun rests against a vehicle seat.

It is a further object of the present invention to provide a vehicle gun holding device for holding guns within a vehicle that is easily removable from the vehicle.

The present invention provides a vehicle gun holding device for holding guns in a vehicle that has a floor with a longitudinally extending raised portion and a seat mounted on the floor that includes a base generally shaped to fit crosswise on the longitudinally extending raised portion of the floor in front of the seat and first gun holding means projecting from the portion of the base that is shaped to fit on one side of the raised portion of the floor of the vehicle for holding a portion of a gun that has another portion resting upon the vehicle seat. Second gun holding means also projects from the portion of the base that is shaped to fit on the opposite side of the raised portion of the floor of the vehicle for holding a portion of another gun that has another portion resting upon the vehicle seat and means are associated with the base for attaching the base to the longitudinally extending raised portion of the floor in front of the seat.

BRIEF DESCRIPTION OF THE DRAWINGS

The invention will be hereinafter more fully described with reference to the accompanying drawings in which:

FIG. 1 is a perspective view of a portion of the passenger compartment of a vehicle such as an automobile illustrating the vehicle gun holding device of the present invention in use holding guns within the vehicle passenger compartment;

FIG. 2 is a plan view of the vehicle gun holding device illustrated in FIG. 1 with certain parts broken away attached to a broken segment of the floor of the vehicle passenger compartment;

FIG. 3 is a cross sectional view of the gun holding device of the present invention taken on the line 3—3 of FIG. 2;

FIG. 4 is an enlarged broken perspective view of a portion of the structure illustrated in FIG. 1 illustrating how the gun holding device of the present invention is capable of being mounted on or attached to the floor of the passenger compartment of a vehicle;

FIG. 5 is a perspective view of a portion of the passenger compartment of a vehicle such as an automobile illustrating an additional embodiment of the gun holding device of the present invention in use holding guns within the vehicle passenger compartment;

FIG. 6 is a plan view of the vehicle gun holding device illustrated in FIG. 5 with certain parts broken away attached to a broken segment of the floor of the vehicle passenger compartment; and FIG. 7 is a cross sectional view of the gun holding device taken on the line 7—7 of FIG. 6.

DETAILED DESCRIPTION OF THE PREFERRED EMBODIMENTS

Referring first to FIGS. 1 through 4 the vehicle gun holding device of the present invention is generally designated by the number 10 and is illustrated attached to or mounted on a portion of the raised curved drive shaft housing or portion 11 of the floor 12 of the passenger compartment 13 of a vehicle, such as an automobile, that extends longitudinally within the vehicle passenger compartment and covers the upper portion of the vehicle's drive shaft. The floor 12 has a metal floor panel 12a and a fibrous or pierceable covering 12b. The vehicle gun holding device 10 comprises an elongated narrow base designated generally by the number 14 that is generally shaped to fit crosswise on the curved raised longitudinally extending portion 11 of the floor 12 of the passenger compartment in front of the front seat. The elongated base 14 comprises a base member 15 that has a portion that is shaped to fit on one side of the raised curved floor portion 11 and another base member 16 that has a portion that is shaped to fit on the opposite side of the raised floor portion. The base members 15 and 16 are substantially identical to each other and the base member 15 has a flat inner portion 17, and a flat intermediate portion 18 that depends downwardly from the outer end of the flat inner portion so that the intermediate and the inner portion intersect each other at an angle of approximately 35°. The base member 15 also has a short flat outer portion 19 that depends downwardly from the outer portion of the intermediate portion 18 at an angle of approximately 35°. In a similar manner, the base member 16 has a flat inner portion 20 and a flat intermediate portion 21 that depends downwardly from the outer end of the flat inner portion at an angle of approximately 35°. The base member 16 also has a short flat outer portion 22 that depends downwardly from the outer portion of the intermediate portion 21 at an angle of also approximately 35°.

First gun holding means comprising a hook member 23 projects from the upper surface of the intermediate portion 18 of the base portion or member 15 and the hook member 23 is mounted on the upper surface of the intermediate portion by means of two rivets 24 that fit within holes 25 and 26 in the lower flat portion 27 of the hook member and respective holes 28 and 29 in the intermediate portion of the base member 15 as best illustrated in FIG. 3. The hook member 23 has a curved portion 30 that curves in an upward direction from the lower flat portion 27 near the outer end of the lower flat portion. Another flat portion 31 extends from the upper end of the curved portion 30 and this flat portion lies generally parallel to the lower flat portion 27. A short flat portion 32 extends from the inner end of the flat portion 31 and it lies in a plane that is generally parallel to the plane in which the flat inner portion 17 lies. The shape of the various portions of the hook member 23 makes it readily adapted to receive and hold or support a portion of the barrel of a gun such as a rifle, carbine, shotgun or the like when another portion of the gun is resting upon a nearby vehicle seat and the gun holding device is properly mounted in the vehicle.

Second gun holding means comprising another hook member 33 that is substantially identical to the hook member 23 projects from the upper surface of the intermediate portion 21 of the base portion or member 16 and this hook member is mounted on the upper surface of the intermediate portion by means of two rivets 34 that fit within holes 35 and 36 in the lower flat portion 37 of the hook member and respective holes 38 and 39 in the intermediate portion of the base member 16 as best illustrated in FIG. 3. The hook member 33 has a curved portion 40 that is substantially identical to the curved portion 30 of the base member 15 and it curves in an upward direction from the lower flat portion 37 near the outer end of the lower flat portion. Another flat portion 41 extends from the upper end of the curved portion 40 and this flat portion lies generally parallel to the lower flat portion 37. A short flat portion 42 extends from the inner end of the flat portion 41 and it lies in a plane that is generally parallel to the plane in which the inner portion 20 lies. The shape of the various portions of the left hook member 33 are substantially identical to the corresponding portions of the hook member 23 and thus this hook member is also readily adapted to receive and hold or support a portion of the barrel of a gun such as a rifle, carbine, shotgun or the like when another portion of the gun is resting upon a nearby vehicle seat and the gun holding device is properly mounted in the vehicle. It should be noted that the free inner ends of the short flat portions 32 and 42 of the respective hook members 23 and 33 point generally inward toward each other and these ends are located well above the level of the highest upper surface of the base 14. This permits a gun barrel to be readily inserted into or removed from the hook members.

The inner flat portion 20 of the base member 16 is located on top of the inner flat portion 17 of the base member 15 and these inner flat portions may be fastened to each other by spot welding or by other suitable known techniques. As best illustrated in FIGS. 2 through 4, attaching means comprising an attaching clip for attaching the gun holding device 10 on the curved portion 11 of the vehicle floor 12 is fastened to the underside of the inner flat portion 17 by screws 44, one of which extends through concentric holes 45 and 46 in the respective inner flat portion 20, inner flat portion 17, and into a threaded hole 47 in the substantially flat top 48 of the attaching clip 43. In a similar manner, the other identical screw 44 extends through other concentric holes 49 and 50 in the respective inner flat portion 20, inner flat portion 17, and into a threaded hole 51 in the top 48 of the clip 43. The clip 43 has four spaced prongs 52, 53, 54 and 55 that lie parallel to and are spaced away from and below the top 48 of the clip. These prongs 52, 53, 54 and 55 are adapted to be inserted into and removed from the floor covering 12b as best illustrated in FIG. 4. As illustrated in FIG. 4, the clip top 48 has a forward portion 56 that has a curved depression which extends downward toward the prongs 52, 53, 54 and 55 and runs generally perpendicular to the long axis of the clip top. This upper depressed forward portion 56 of the clip 43 presses against the upper surface of the floor covering 12b when the prongs 52, 53, 54 and 55 have been inserted into the floor covering so that the clip 43 is held in place. It should be noted that the forward edge 57 of the forward portion 56 is curved in an upward direction so that the forward edge slips easily over the upper surface of the floor covering 12b as the prongs of the clip 43 are being inserted into the floor covering. As illustrated in FIGS. 2 and 3, when the clip prongs 52, 53, 54 and 55 have been fully inserted into the floor covering 12b the prongs grip the floor covering and attach the base 14 of the gun holding device 10 on the raised portion 11 of the vehicle floor so that the hook members 23 and 33 are on opposite sides of the raised portion 11.

As best illustrated in FIG. 3, the hook member 23, the intermediate portion 18, and the short outer portion 19 of the base member 15 have a suitable plastic resilient coating or layer 58 that prevents a gun from being damaged by these parts. In a similar manner the hook member 33, the intermediate portion 21, and the short outer portion 22 of the base member 14 have the same type suitable plastic resilient layer or coating 59 to prevent possible damage to the guns.

In order to utilize the embodiment of the invention illustrated in FIGS. 1 through 4, a person inserts the prongs 52, 53, 54 and 55 of the clip 43 into the floor covering 12b on top of the curved floor portion 11 of the vehicle in front of the front vehicle seat so that the base 14 of the gun holding device is attached to the raised curved longitudinally extending floor portion in front of the front vehicle seat. The vehicle occupant can then place the forward portion of a gun barrel into one of the hook members 23 or 33 and the portion of the gun including the buttstock and in some instances at least a portion of the receiver is placed against the nearby front vehicle seat in the manner illustrated in FIG. 1 where a shotgun 60 is shown with the forward portion of its barrel 61 being held by the hook member 33 and the buttstock 62 and a portion of the receiver 63 are shown resting against the front vehicle seat 64 that is mounted on the floor of the vehicle. The barrel of another gun can be placed in the opposite hook member 33 or 23 as the case may be as illustrated in FIG. 1 where the forward portion of the barrel 65 of another shotgun 66 is being held by the hook member 23. The buttstock 67 and a portion of the receiver 68 is also placed against the seat 64. When either gun 60 or 66 is needed, the vehicle occupant can then conveniently and rapidly withdraw the forward portion of either the barrel 61 or barrel 65 from the respective hook members 33 and 23.

An additional embodiment of the present invention is illustrated in FIGS. 5 through 7, where the additional vehicle gun holding device of the present invention is designated generally by the number 69. The vehicle gun holding device 69 is generally similar to the previously discussed gun holding device 10 and the additional holding device 69 is adapted to be used within the vehicle passenger compartment 13 and is adapted to fit crosswise on the curved portion 11 of the vehicle floor 12 that covers the upper portion of the drive shaft as best illustrated in FIG. 5. It should be noted that the vehicle floor 12 has the metal floor panel 12a and the fibrous or pierceable covering 12b. The vehicle gun holding device 69 comprises the same base 14 that is generally shaped to fit crosswise on the curved raised portion 11 of the floor 12 of the passenger compartment 13 in front of the front seat and the base comprises the same base members 15 and 16 that were previously described in relation to the embodiment illustrated in FIGS. 1 through 4. The same mounting clip 43 is also associated with the base 14. However, the vehicle gun holding device 69 has modified hook members 70 and 71 that are substantially identical that project from the upper surface of the respective intermediate portions 18 and 21 of the respective base members 15 and 16.

The hook member 70 has a lower flat portion 72 that is mounted on the upper surface of the intermediate portion 18 of the right base member 15 by means of rivets 73 that fit within holes 74 and 75 in the lower flat portion and respective aligned holes 28 and 29 in the intermediate portion of the right base member. The hook member 70 has a curved portion 76 that curves in an upward direction from the lower flat portion 72 near the outer end of the lower flat portion. The hook member 70 also has another upper flat portion 77 that extends from the upper end of the curved portion 76 and this upper flat portion lies generally parallel to the lower flat portion 72. In a similar manner, the hook member 71 has a lower flat portion 78 that is mounted on the upper surface of the intermediate portion 21 of the base member 16 by means of rivets 79 that fit within holes 80 and 81 in the lower flat portion and respective aligned holes 38 and 39 in the intermediate portion 21 of the base member. The hook member 71 also has a curved portion 82 that curves in an upward direction from the lower flat portion 78 near the outer end of the lower flat portion and another flat portion 83 that extends from the upper end of the curved portion. This upper flat portion 83 also lies generally parallel to the lower flat portion 78. It should be noted that the free inner ends of the upper flat portions 77 and 83 of the respective hook members 70 and 71 point generally inward and these ends are located well above the level of the highest upper surface of the base 14 in order to permit a buttstock of a gun to be readily inserted into or removed from the hook members. The shape of the hook members 70 and 71 permits them to each receive and hold a portion of the buttstock of a gun when another portion of the gun is resting upon a nearby vehicle seat and the gun holding device is properly mounted in the vehicle.

As best illustrated in FIG. 7, the hook member 70, the intermediate portion 18, and the short outer portion 19 of the base member 15 have a suitable plastic resilient coating of layer 84 that prevents a gun from being possibly damaged by these parts. In addition, the hook member 71, the intermediate portion 21, and the short outer portion 22' of the base member 16 have the same type of suitable plastic resilient layer or coating 85 to prevent any damage to the guns.

It should be noted that the vehicle gun holding device 69 is attached to the curved raised portion 11 of the floor 12 of the vehicle passenger compartment by means of the mounting clip 43 in the same manner as the previously described vehicle gun holding device 10.

In order to utilize the embodiment illustrated in FIGS. 5 through 7, after it has been attached to the curved portion 11 of the vehicle floor, the occupant places the rearward portion of a buttstock into one of the hook members 70 or 71, and the barrel portion of the gun is placed against the nearby front vehicle seat in the manner illustrated in FIG. 5 where a shotgun 86 is shown with the rearward portion of its buttstock 87 being held by the hook member 71 and the barrel 88 is shown resting against the front vehicle seat 64 that is mounted on the vehicle floor 12. The buttstock of another gun can then be placed in he opposite hook member that is not presently the a gun as illustrated in FIG. 5 where the rearward portion of the buttstock 89 of another shotgun 90 is being held by the hook member 70. The barrel 91 of the shotgun 90 is similarly placed against the vehicle seat 64. Either shotgun 86 or 90 can then be conveniently and rapidly put into use by withdrawing the buttstock 87 or 89 from the respective hook members 71 and 70.

The particular configuration of the base 14 of the vehicle gun holding device 10 or 69 of the invention is important since it permits the base to give to some extent and thus be adapted to fit at various locations on the curved portion 11 of the vehicle floor 12 or be adapted to fit on curved portions of vehicle floors that have slightly different dimensions or slightly different shapes whereas a base that precisely matched the shape of a particular curved portion of a vehicle floor would not possess this flexibility. Although for some applications the base 14 may be made in one piece, the two piece construction is preferred since it permits the inner portions 17 and 20 of the respective base members 15 and 16 to be spot welded at different locations depending upon the size and configuration of the drive shaft housing portion 11 of the floor of the vehicle that the base is to rest upon.

As used herein the term gun is meant to include a shotgun, rifle, carbine, machinegun, submachinegun and the like.

Although the invention has been described in considerable detail with reference to certain preferred embodiments, it will be understood that variations and modifications may be made within the spirit and scope of the invention as defined in the appended claims.

What is claimed is:

1. A vehicle gun holding device for holding guns in a vehicle that has a floor with a longitudinally extending raised portion and a seat mounted on the floor comprising a base generally shaped to fit crosswise on the longitudinally extending raised portion of the floor in front of the seat, first gun holding means projecting from the portion of the base that is shaped to fit on one side of the raised portion of the floor of the vehicle for holding a portion of a gun that has another portion resting upon the vehicle seat, second gun holding means projecting from the portion of the base that is shaped to fit on the opposite side of the raised portion of the floor of the vehicle for holding a portion of another gun that has another portion resting upon the vehicle seat, and means associated with said base for attaching said base to the longitudinally extending raised portion of the floor in front of the seat.

2. The vehicle gun holding device of claim 1 wherein said first and said second gun holding means each comprises a hook member having its free end pointing generally inward.

3. The vehicle gun holding device of claim 2 wherein said hook members are each shaped to receive and hold a portion of the barrel of a gun.

4. The vehicle gun holding device of claim 2 wherein said hook members are each shaped to receive and hold a portion of the buttstock of a gun.

5. The vehicle gun holding device of claim 2 wherein said base and said hook members have at least a partial resilient coating.

6. The vehicle gun holding device of claim 2 wherein the free ends of said hook members are located above the level of the highest upper surface of said base.

7. The vehicle gun holding device of claim 1 wherein the vehicle floor has a pierceable covering and wherein said attaching means comprises means for attaching said base to the pierceable floor covering.

8. The vehicle gun holding device of claim 7 wherein said means for attaching said base to the pierceable floor covering comprises a clip.

9. The vehicle gun holding device of claim 8 wherein said clip has prongs adapted to be inserted into the pierceable floor covering.

10. The vehicle gun holding device of claim 9 wherein said clip has an upper forward portion adapted to press against the upper surface of the pierceable floor covering when said prongs have been inserted into the pierceable floor covering.

* * * * *